US010833606B2

(12) United States Patent
Guan

(10) Patent No.: US 10,833,606 B2
(45) Date of Patent: Nov. 10, 2020

(54) CURRENT SAMPLING AND PROCESSING DEVICE AND METHOD FOR AN INVERTER

(71) Applicant: NIO NEXTEV LIMITED, Hong Kong (CN)

(72) Inventor: Xiaoqiang Guan, Shanghai (CN)

(73) Assignee: NIO NEXTEV LIMITED, Hong Kong (CN)

( * ) Notice: Subject to any disclaimer, the term of this patent is extended or adjusted under 35 U.S.C. 154(b) by 164 days.

(21) Appl. No.: 15/718,582

(22) Filed: Sep. 28, 2017

(65) Prior Publication Data

US 2018/0091063 A1    Mar. 29, 2018

(30) Foreign Application Priority Data

Sep. 29, 2016  (CN) .......................... 2016 1 0861786

(51) Int. Cl.
*H02M 7/5395* (2006.01)
*H02M 7/5387* (2007.01)
*H02M 1/36* (2007.01)
*H02M 1/00* (2006.01)

(52) U.S. Cl.
CPC .......... *H02M 7/5395* (2013.01); *H02M 1/36* (2013.01); *H02M 7/5387* (2013.01); *H02M 2001/0009* (2013.01)

(58) Field of Classification Search
None
See application file for complete search history.

(56) References Cited

U.S. PATENT DOCUMENTS 9,570,980 B2 *  2/2017  Bodano ................. H02M 3/158

FOREIGN PATENT DOCUMENTS

| CN | 103731148 | 4/2014 |
| CN | 203929859 | 11/2014 |
| CN | 105738686 | 7/2016 |
| CN | 105978432 | 9/2016 |
| JP | 2003-243985 | 8/2003 |

OTHER PUBLICATIONS

International Search Report for International (PCT) Patent Application No. PCT/CN2017/091785, dated Oct. 12, 2017, 5 pages.

* cited by examiner

*Primary Examiner* — Jue Zhang
*Assistant Examiner* — Henry E Lee, III
(74) *Attorney, Agent, or Firm* — Sheridan Ross P.C.

(57) ABSTRACT

Devices and methods are provided for current sampling and processing associated with, for example, an inverter for an electric vehicle to improve the performance of the inverter. By providing initial parameters for the devices and methods as well as providing estimates of some parameters, the devices and methods can reduce a delay in the time required to perform the sampling and processing of the current. Specifically, parameters for the next beat of a cycle are estimated in the previous beat to complete processing of the current faster, which reduces the delay time. This reduction in delay time increases an output bandwidth of the current loop, i.e., a maximum frequency of an alternating current that can be output by the current loop without attenuation, which improves the performance of the inverter.

11 Claims, 4 Drawing Sheets

CURRENT SAMPLING AND PROCESSING DEVICE AND METHOD FOR AN INVERTER

CROSS-REFERENCE TO RELATED APPLICATION

This application claims the benefit of China Patent Application No. 201610861786.5 filed Sep. 29, 2016, the entire disclosure of which is incorporation herein by reference.

TECHNICAL FIELD

The present invention relates to current sampling and processing device and method, in particular to current sampling and processing device and method for an inverter.

BACKGROUND OF THE INVENTION

With the development and popularization of electric control systems (e.g. electric control systems in battery electric vehicles/hybrid electric vehicles) at present, improving the performance of current sampling and processing of an inverter (a device for converting direct current into alternating current) has become increasingly important.

Existing inverters typically adopt Pulse Width Modulation (PWM), i.e. a current controller first samples to obtain a motor phase current and then calculates a reference voltage vector by means of a vector control algorithm, then it calculates a duty cycle by means of PWM and outputs a PWM wave signal to control on and off of IGBT (Insulated Gate Bipolar Transistor), wherein one of the important indexes influencing the performance of the inverter is an output bandwidth of a current loop, i.e. a maximum frequency of an alternating current that can be output by the current loop without attenuation, and larger output bandwidth of the current loop means better performance of the inverter.

FIG. 1 is a schematic drawing of an existing Pulse Width Modulation (PWM) method for an inverter. As shown in FIG. 1, in a conventional PWM method, current sampling is performed at the overflow time or the underflow time of a PWM cycle, then in the time of a next half PWM cycle, the sampled values are read for calculation, and subsequently, the voltage value is updated after a lagging of half a PWM cycle, thus a delay time for general sampling, calculating and updating to the final voltage time is $t_1=t_h+2.5*t_f$, wherein $t_h$ is a hardware delay, and $t_f$ is half a PWM cycle.

However, the above existing technical solution has such a problem as that the operations of general sampling and calculating and updating the voltage have a larger delay time, so the output bandwidth of the current loop is smaller, which will significantly influence the performance of the inverter.

Therefore, there is a need to provide current sampling and processing device and method having short delay time for an inverter.

SUMMARY OF THE INVENTION

In order to solve the above problem in the existing technical solution, the present invention proposes current sampling and processing device and method having short delay time for an inverter.

The object of the present invention is achieved through the following technical solutions:

A current sampling and processing device for an inverter, which comprises: an initialization unit for setting initialization parameters during initial start-up of the current sampling and processing device and subsequently enabling a pulse width modulation counter, said initialization parameters at least including an initial value of the pulse width modulation counter, an initial value of a first comparison and matching parameter and an initial value of a second comparison and matching parameter;

a current sampling triggering and implementing unit that triggers and implements a current sampling operation when the value of the pulse width modulation counter equals to the value of the second comparison and matching parameter;

a current loop calculating and updating unit for calculating a value of a new first comparison and matching parameter based on the sampled current value and then actually updating the value of the first comparison and matching parameter into the calculated value of the new first comparison and matching parameter in the immediately following overflow or underflow time;

a voltage output unit for outputting a voltage corresponding to the updated value of the first comparison and matching parameter to control on and off of a circuit device when the updated value of the first comparison and matching parameter equals to the value of the pulse width modulation counter.

In the above disclosed solution, preferably, the circuit device is an insulated gate bipolar transistor.

In the above disclosed solution, preferably, the initialization unit sets the initialization parameters by setting the initial value of the pulse width modulation counter to be zero, setting a maximum value of the pulse width modulation counter to be half of the value of the PWM cycle, setting a counting mode of the pulse width modulation counter to be symmetrical pulse width modulation, setting the mode of updating of the first comparison and matching parameter to be updating at the overflow or underflow time, setting the initial value of the first comparison and matching parameter to be a half of the maximum value of the pulse width modulation counter, and setting the initial value of the second comparison and matching parameter.

In the above disclosed solution, preferably, the current loop calculating and updating unit is further configured to trigger an interrupt event upon completion of the current sampling operation so as to calculate the value of the new first comparison and matching parameter based on the sampled current value and record run time of the interrupt event by a clock, thereby predicting an estimated value of the second comparison and matching parameter for a next beat based on the recorded run time of the interrupt event, and then updating the value of the second comparison and matching parameter to be the predicted estimated value.

In the above disclosed solution, preferably, the predicted estimated value includes the run time of the interrupt event and a predefined time margin.

In the above disclosed solution, preferably, the pulse width modulation counter, after being enabled, starts to count up from a preset initial value zero and counts down to zero upon reaching the maximum value, and repeats this process to produce a PWM carrier.

In the above disclosed solution, preferably, the voltages output by the voltage output unit 4 for controlling on and off of the circuit device are three groups of complementary PWM output voltages for controlling three groups of circuit devices formed respectively by two insulated gate bipolar transistors so as to generate alternating current.

In the above disclosed solution, preferably, the current sampling triggering and implementing unit, current loop calculating and updating unit and voltage output unit periodically perform their operations.

In the above disclosed solution, preferably, part of or all of the initialization unit, the current sampling triggering and implementing unit, the current loop calculating and updating unit and the voltage output unit are realized by a MCU and/or a DSP.

In the above disclosed solution, preferably, a total delay from the current sampling to the actual update of the output voltage is determined by the formula of $t_2=t_h+t_s+0.5*t_f$, wherein $t_h$ is a hardware delay, $t_f$ is half a PWM cycle, and $t_s$ is current loop calculation time.

The object of the present invention can also be achieved by the following technical solutions:

A current sampling and processing method for an inverter, which comprises the steps of:

(A1) setting initialization parameters during initial start-up of the current sampling and processing process and subsequently enabling a pulse width modulation counter, said initialization parameters at least including an initial value of the pulse width modulation counter, an initial value of a first comparison and matching parameter and an initial value of a second comparison and matching parameter;

(A2) triggering and implementing a current sampling operation when the value of the pulse width modulation counter equals to the value of the second comparison and matching parameter;

(A3) calculating a value of a new first comparison and matching parameter based on the sampled current value and then actually updating the value of the first comparison and matching parameter into the calculated value of the new first comparison and matching parameter in the immediately following overflow or underflow time;

(A4) outputting a voltage corresponding to the updated value of the first comparison and matching parameter to control on and off of a circuit device when the updated value of the first comparison and matching parameter equals to the value of the pulse width modulation counter.

The current sampling and processing device and method for an inverter as disclosed in the present invention have the following advantages: the sampling time for the next beat is predicted in the period of the last beat, so the calculation task is immediately performed after completion of the current sampling to obtain the value of the first comparison and matching parameter corresponding to the next beat voltage that needs to be output, and as soon as the calculation task ends, the overflow or underflow time of the PWM carrier arrives, so that the voltage value can be immediately updated, therefore, the sampling, processing and updating are performed consecutively to significantly reduce the delay time and increase the bandwidth of the current loop.

BRIEF DESCRIPTION OF THE DRAWINGS

The technical features and advantages of the present invention will be better appreciated with reference to the drawings, wherein.

DETAILED DESCRIPTION OF THE INVENTION

Figure 1:
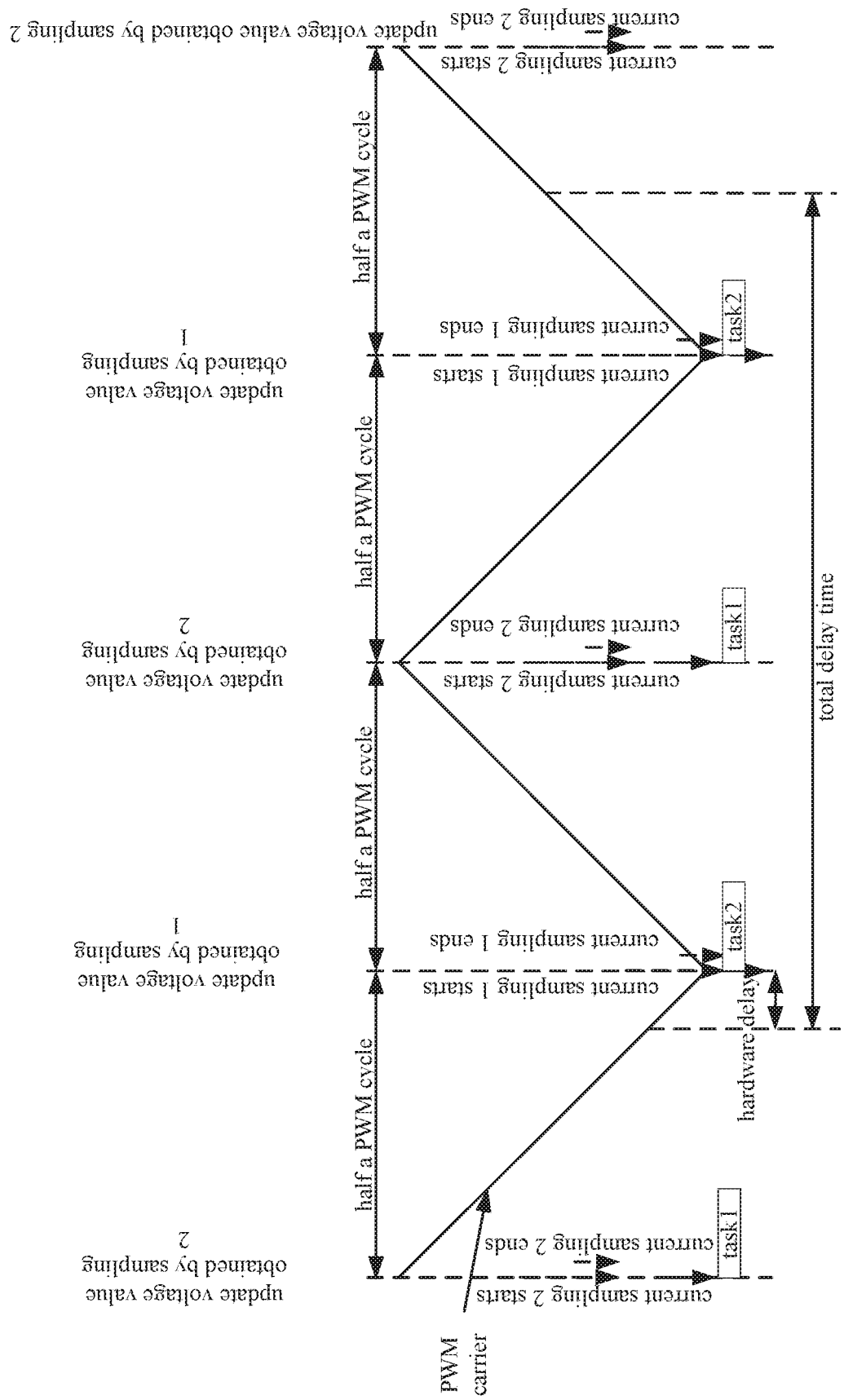
FIG. 1 is a schematic drawing of an existing pulse width modulation (PWM) method for an inverter.
Figure 2:
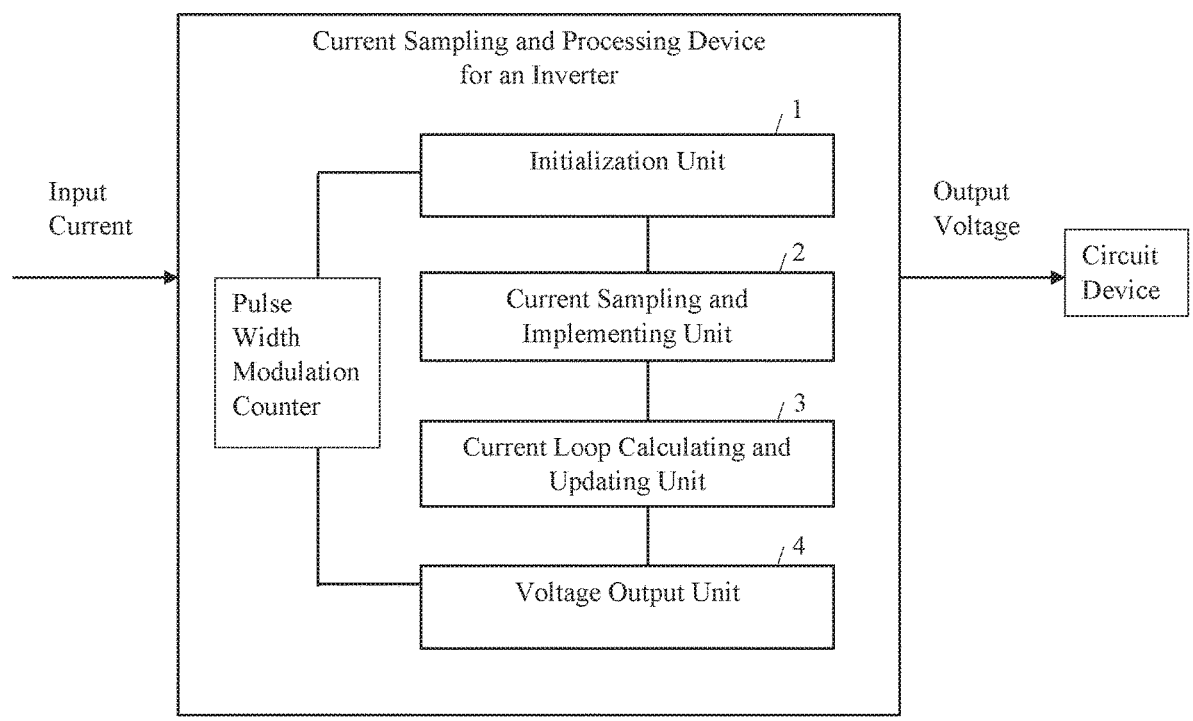
FIG. 2 is a schematic structural diagram of a current sampling and processing device for an inverter according to an embodiment of the present invention.

FIG. 2 is a schematic structural diagram of a current sampling and processing device for an inverter according to an embodiment of the present invention. As shown in FIG. 2, the current sampling and processing device for an inverter as disclosed in the present invention comprises an initialization unit 1, a current sampling triggering and implementing unit 2, a current loop calculating and updating unit 3 and a voltage output unit 4. The initialization unit 1 is used for setting initialization parameters during initial start-up of the current sampling and processing device and subsequently enabling a pulse width modulation (PWM) counter, said initialization parameters at least including an initial value of the pulse width modulation (PWM) counter, an initial value of a first comparison and matching parameter and an initial value of a second comparison and matching parameter. The current sampling triggering and implementing unit 2 triggers and implements a current sampling operation (e.g. AD sampling) when the value of the pulse width modulation counter equals to the value of the second comparison and matching parameter. The current loop calculating and updating unit 3 calculates a value of a new first comparison and matching parameter based on the sampled current value and then actually updates the value of the first comparison and matching parameter into the calculated value of the new first comparison and matching parameter in the immediately following overflow or underflow time (i.e. if the overflow time arrives immediately after, then the value of the first comparison and matching parameter is actually updated into the calculated value of the new first comparison and matching parameter at said overflow time, while if the underflow time arrives immediately after, then the value of the first comparison and matching parameter is actually updated into the calculated value of the new first comparison and matching parameter at said underflow time). The voltage output unit 4 outputs a voltage corresponding to the updated value of the first comparison and matching parameter to control on and off of a circuit device when the updated value of the first comparison and matching parameter equals to the value of the pulse width modulation counter.

Preferably, in the current sampling and processing device for an inverter as disclosed in the present invention, the circuit device is an insulated gate bipolar transistor (IGBT).

Preferably, in the current sampling and processing device for an inverter as disclosed in the present invention, the initialization unit 1 sets the initialization parameters by setting the initial value of the pulse width modulation counter to be zero, setting a maximum value of the pulse width modulation counter to be half of the value of the PWM cycle, setting a counting mode of the pulse width modulation counter to be symmetrical pulse width modulation, setting the mode of updating of the first comparison and matching parameter to be updating at the overflow or underflow time, setting the initial value of the first comparison and matching parameter to be a half of the maximum value of the pulse width modulation counter (i.e. 50% duty cycle), and setting the initial value of the second comparison and matching parameter (which can be obtained by means of empirical scaling).

Preferably, in the current sampling and processing device for an inverter as disclosed in the present invention, the current loop calculating and updating unit 3 is further configured to trigger an interrupt event (i.e. "task 1" indicated in FIG. 4) upon completion of the current sampling operation so as to calculate the value of the new first comparison and matching parameter based on the sampled current value and record the run time of the interrupt event by a clock, thereby predicting an estimated value of the second comparison and matching parameter for a next beat based on the recorded run time of the interrupt event, and then updating the value of the second comparison and matching parameter to be the predicted estimated value.

Preferably, in the current sampling and processing device for an inverter as disclosed in the present invention, the predicted estimated value includes the run time of the interrupt event and a predefined time margin.

Preferably, in the current sampling and processing device for an inverter as disclosed in the present invention, the pulse width modulation counter, after being enabled, starts to count up from a preset initial value zero and counts down to zero upon reaching the maximum value (i.e. half of the PWM cycle), and repeats this process to produce a PWM carrier.

Preferably, in the current sampling and processing device for an inverter as disclosed in the present invention, the voltages output by the voltage output unit 4 for controlling on and off of the circuit device are three groups of complementary PWM output voltages for controlling three groups of circuit devices formed respectively by two insulated gate bipolar transistors (IGBT) so as to generate alternating current.

Preferably, in the current sampling and processing device for an inverter as disclosed in the present invention, the current sampling triggering and implementing unit 2, the current loop calculating and updating unit 3 and the voltage output unit 4 periodically perform their operations.

Preferably, in the current sampling and processing device for an inverter as disclosed in the present invention, part of or all of the initialization unit 1, the current sampling triggering and implementing unit 2, the current loop calculating and updating unit 3 and the voltage output unit 4 are realized by a MCU (Micro-Control Unit) and/or a DSP (Digital Signal Processor).

It can be seen that the current sampling and processing device for an inverter as disclosed in the present invention has the following advantages: the sampling time for the next beat is predicted in the period of the last beat, so the calculation task is immediately performed after completion of the current sampling to obtain the value of the first comparison and matching parameter corresponding to the next beat voltage that needs to be output, and as soon as the calculation task ends, the overflow or underflow time of the PWM carrier arrives, so that the voltage value can be immediately updated, therefore, the sampling, processing and updating are performed consecutively to significantly reduce the delay time and increase the bandwidth of the current loop.

Figure 3:
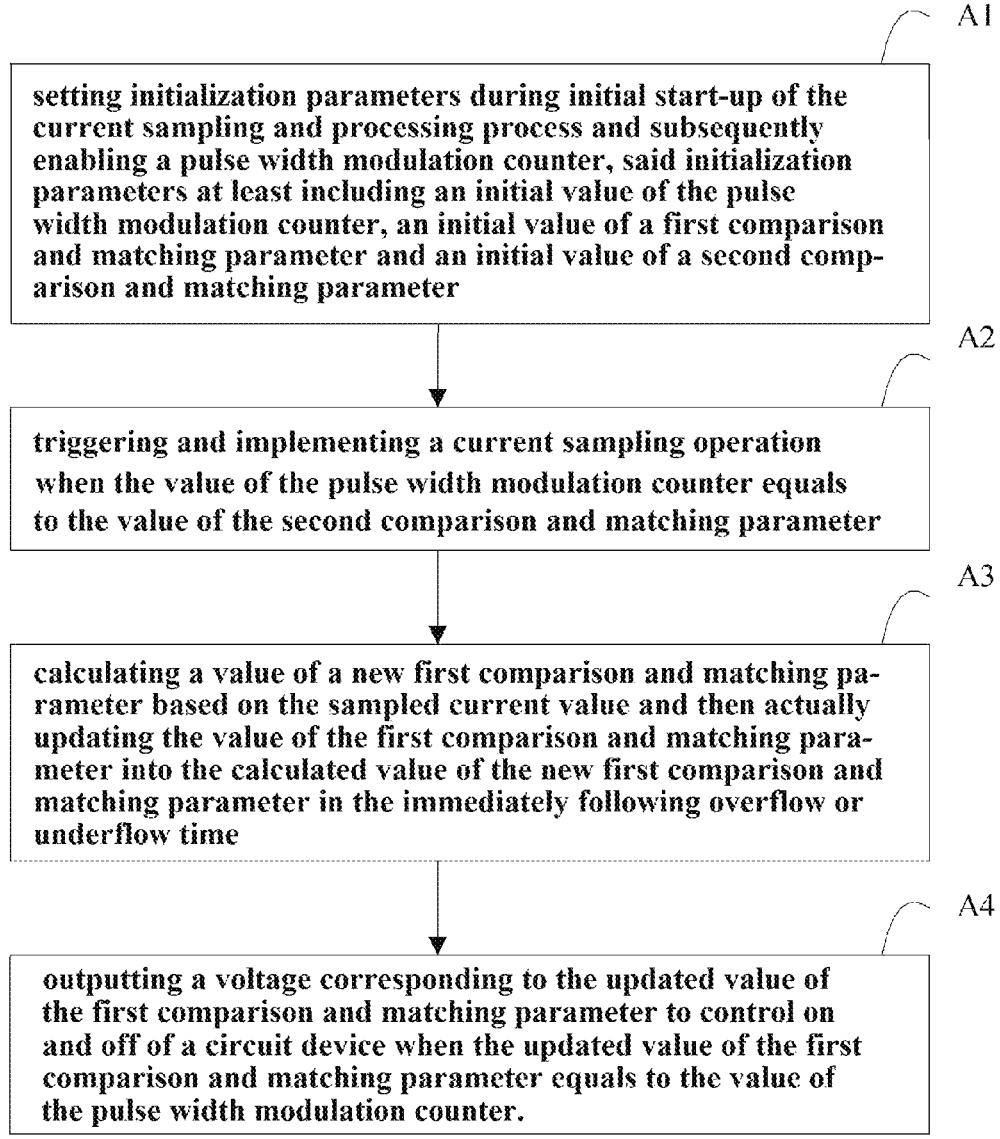
FIG. 3 is a flow chart of a current sampling and processing method for an inverter according to an embodiment of the present invention.

FIG. 3 is a flow chart of a current sampling and processing method for an inverter according to an embodiment of the present invention. As shown in FIG. 3, the current sampling and processing method for an inverter as disclosed in the present invention comprises the steps of: (A1) setting initialization parameters during initial start-up of the current sampling and processing process and subsequently enabling a pulse width modulation (PWM) counter, said initialization parameters at least including an initial value of the pulse width modulation (PWM) counter, an initial value of a first comparison and matching parameter and an initial value of a second comparison and matching parameter; (A2) triggering and implementing a current sampling operation (e.g. AD sampling) when the value of the pulse width modulation counter equals to the value of the second comparison and matching parameter; (A3) calculating a value of a new first comparison and matching parameter based on the sampled current value and then actually updating the value of the first comparison and matching parameter into the calculated value of the new first comparison and matching parameter in the immediately following overflow or underflow time (i.e. if the overflow time arrives immediately after, then the value of the first comparison and matching parameter is actually updated into the calculated value of the new first comparison and matching parameter at said overflow time, while if the underflow time arrives immediately after, then the value of the first comparison and matching parameter is actually updated into the calculated value of the new first comparison and matching parameter at said underflow time); (A4) outputting a voltage corresponding to the updated value of the first comparison and matching parameter to control on and off of a circuit device when the updated value of the first comparison and matching parameter equals to the value of the pulse width modulation counter.

Preferably, in the current sampling and processing method for an inverter as disclosed in the present invention, the circuit device is an insulated gate bipolar transistor (IGBT).

Preferably, in the current sampling and processing device for an inverter as disclosed in the present invention, the step (A1) further comprises: setting the initialization parameters by setting the initial value of the pulse width modulation counter to be zero, setting a maximum value of the pulse width modulation counter to be half of the value of the PWM cycle, setting a counting mode of the pulse width modulation counter to be symmetrical pulse width modulation, setting the mode of updating of the first comparison and matching parameter to be updating at the overflow or underflow time, setting the initial value of the first comparison and matching parameter to be a half of the maximum value of the pulse width modulation counter (i.e. 50% duty cycle), and setting the initial value of the second comparison and matching parameter (which can be obtained by means of empirical scaling).

Preferably, in the current sampling and processing method for an inverter as disclosed in the present invention, said step (A3) further comprises triggering an interrupt event (i.e. "task 1" indicated in FIG. 4) upon completion of the current sampling operation so as to calculate the value of the new first comparison and matching parameter based on the sampled current value and record the run time of the interrupt event by a clock, thereby predicting an estimated value of the second comparison and matching parameter for a next beat based on the recorded run time of the interrupt event, and then updating the value of the second comparison and matching parameter to be the predicted estimated value.

Preferably, in the current sampling and processing method for an inverter as disclosed in the present invention, the predicted estimated value includes the run time of the interrupt event and a predefined time margin.

Preferably, in the current sampling and processing method for an inverter as disclosed in the present invention, the pulse width modulation counter, after being enabled, starts to count up from a preset initial value zero and counts down to zero upon reaching the maximum value (i.e. half of the PWM cycle), and repeats this process to produce a PWM carrier.

Preferably, in the current sampling and processing device for an inverter as disclosed in the present invention, the output voltages for controlling on and off of the circuit device are three groups of complementary PWM output voltages for controlling three groups of circuit devices formed respectively by two insulated gate bipolar transistors (IGBT) so as to generate alternating current.

Preferably, in the current sampling and processing method for an inverter as disclosed in the present invention, said steps (A2)-(A4) are periodically repeated.

Preferably, in the current sampling and processing method for an inverter as disclosed in the present invention, some or all of steps (A2)-(A4) are performed by a MCU (Micro-Control Unit) and/or a DSP (Digital Signal Processor).

It can be seen that the current sampling and processing method for an inverter as disclosed in the present invention has the following advantages: the sampling time for the next beat is predicted in the period of the last beat, so the calculation task is immediately performed after completion of the current sampling to obtain the value of the first comparison and matching parameter corresponding to the next beat voltage that needs to be output, and as soon as the calculation task ends, the overflow or underflow time of the PWM carrier arrives, so that the voltage value can be immediately updated, therefore, the sampling, processing and updating are performed consecutively to significantly reduce the delay time and increase the bandwidth of the current loop.

Figure 4:
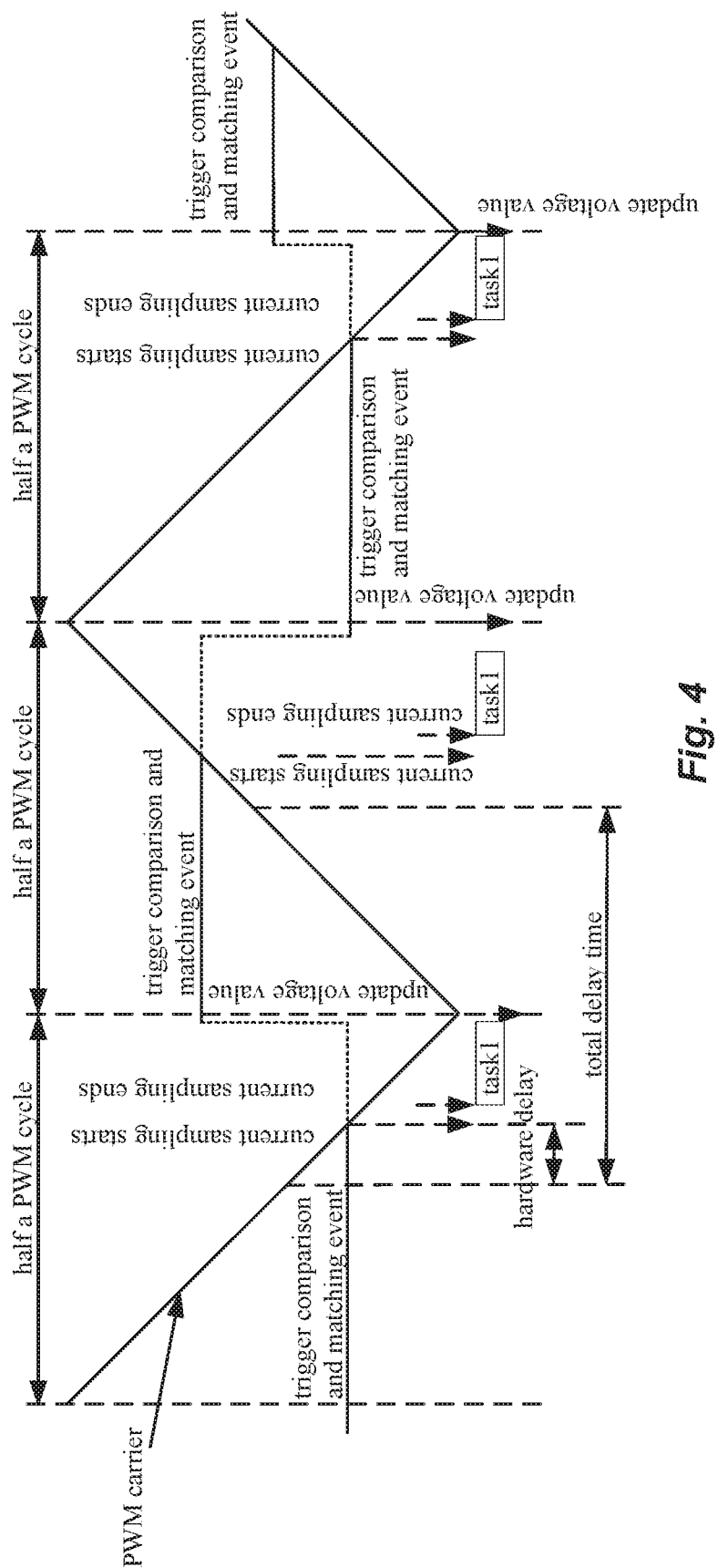
FIG. 4 is a schematic drawing of a pulse width modulation (PWM) method for an inverter according to an embodiment of the present invention.

FIG. 4 is a schematic drawing of a pulse width modulation (PWM) method for an inverter according to an embodiment of the present invention. As shown in FIG. 4, the total delay from the current sampling to the actual update of the output voltage is determined by the formula of $t_2=t_h+t_s+0.5*t_f$, wherein $t_h$ is a hardware delay, $t_f$ is half a PWM cycle, and $t_s$ is current loop calculation time. It can be seen that exemplarily compared to conventional ways of current sampling and processing, the total delay from the current sampling to the actual update of the output voltage is significantly reduced, resulting in an increase of the bandwidth of the current loop by a factor of about 2-3.

Although the present invention is described by the above preferred embodiments, the implementation thereof is not limited to said embodiments. It shall be appreciated that those skilled in the art can make different variations and modifications to the present invention without departing from the principle and scope of the present invention.

What is claimed is:

1. A current sampling and processing device for an inverter, which comprises:
   an initialization unit for setting initialization parameters during initial start-up of the current sampling and processing device and subsequently enabling a pulse width modulation counter, said initialization parameters at least including an initial value of the pulse width modulation counter, an initial value of a first comparison and a first matching parameter and an initial value of a second comparison and a second matching parameter;
   a current sampling triggering and implementing unit that triggers and implements a current sampling operation when the value of the pulse width modulation counter equals to the value of the second comparison and the second matching parameter;
   a current loop calculating and updating unit for calculating a value of a new first comparison and a new matching parameter based on a current value sampled by the current sampling triggering and implementing unit and then updating the value of the first comparison and the first matching parameter into the calculated value of the new first comparison and the new matching parameter in the immediately following overflow or underflow time;
   a voltage output unit for outputting a voltage corresponding to the updated value of the first comparison and the first matching parameter to control on and off of a circuit device when the updated value of the first comparison and the first matching parameter equals to the value of the pulse width modulation counter.

2. The current sampling and processing device for an inverter according to claim 1, wherein the circuit device is an insulated gate bipolar transistor.

3. The current sampling and processing device for an inverter according to claim 2, wherein the initialization unit sets the initialization parameters by setting the initial value of the pulse width modulation counter to be zero, setting a maximum value of the pulse width modulation counter to be half of the value of the pulse width modulator (PWM) cycle, setting a counting mode of the pulse width modulation counter to be symmetrical pulse width modulation, setting the mode of updating of the first comparison and the first matching parameter to be updating at the overflow or underflow time, setting the initial value of the first comparison and the first matching parameter to be a half of the maximum value of the pulse width modulation counter, and setting the initial value of the second comparison and the second matching parameter.

4. The current sampling and processing device for an inverter according to claim 3, wherein the current loop calculating and updating unit is further configured to trigger an interrupt event upon completion of the current sampling operation so as to calculate the value of the new first comparison and the new matching parameter based on the current value and record run time of the interrupt event by a clock, thereby predicting an estimated value of the second comparison and the second matching parameter for a next beat based on the recorded run time of the interrupt event, and then updating the value of the second comparison and the second matching parameter to be the predicted estimated value.

5. The current sampling and processing device for an inverter according to claim 4, wherein the predicted estimated value includes run time of the interrupt event and a predefined time margin.

6. The current sampling and processing device for an inverter according to claim 5, wherein the pulse width modulation counter, after being enabled, starts to count up from a preset initial value zero and counts down to zero upon reaching the maximum value, and repeats this process to produce a PWM carrier.

7. The current sampling and processing device for an inverter according to claim 6, wherein the voltages output by the voltage output unit for controlling on and off of the circuit device are three groups of complementary PWM output voltages for controlling three groups of circuit devices formed respectively by two insulated gate bipolar transistors so as to generate alternating current.

8. The current sampling and processing device for an inverter according to claim 7, wherein the current sampling triggering and implementing unit, current loop calculating and updating unit and voltage output unit periodically perform their operations.

9. The current sampling and processing device for an inverter according to claim 8, wherein part of or all of the initialization unit, the current sampling triggering and implementing unit, the current loop calculating and updating unit and the voltage output unit are realized by a micro-control unit (MCU) and/or a digital signal processor (DSP).

10. The current sampling and processing device for an inverter according to claim 9, wherein a total delay from the current sampling to the update of the output voltage is determined by the formula of t2=th+ts+0.5*tf, wherein th is a hardware delay, tf is half a PWM cycle, and ts is current loop calculation time.

11. A current sampling and processing method for an inverter, which comprises the steps of:
   (A1) setting initialization parameters during initial start-up of the current sampling and processing process and subsequently enabling a pulse width modulation counter, said initialization parameters at least including an initial value of the pulse width modulation counter, an initial value of a first comparison and a first matching parameter and an initial value of a second comparison and a second matching parameter;
   (A2) triggering and implementing a current sampling operation when the value of the pulse width modulation counter equals to the value of the second comparison and the second matching parameter;
   (A3) calculating a value of a new first comparison matching parameter based on a current value sampled by the current sampling operation and then updating the value of the first comparison and the first matching parameter into the calculated value of the new first comparison and the new matching parameter in the immediately following overflow or underflow time;
   (A4) outputting a voltage corresponding to the updated value of the first comparison and the first matching parameter to control on and off of a circuit device when the updated value of the first comparison and the first matching parameter equals to the value of the pulse width modulation counter.

* * * * *